J. CHIPCHASE & A. E. METCALFE.
WRENCH.
APPLICATION FILED JAN. 11, 1911.
1,010,232.
Patented Nov. 28, 1911.
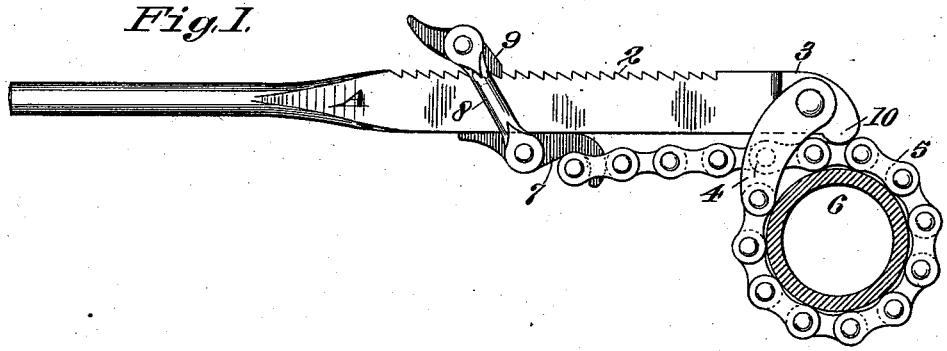
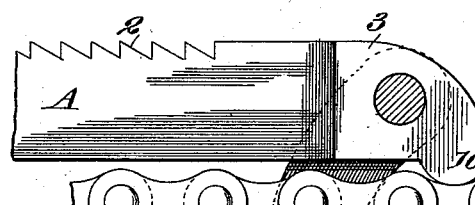
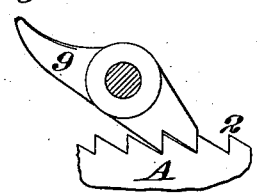
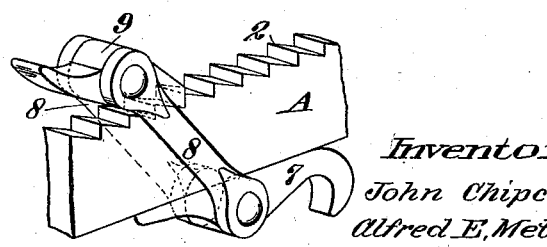
Witnesses,
Charles Pickles
R. A. Berry
Inventors.
John Chipchase,
Alfred E. Metcalfe.
By Geo. H. Strong.
Atty

UNITED STATES PATENT OFFICE.

JOHN CHIPCHASE AND ALFRED ERNEST METCALFE, OF NEWCASTLE-UPON-TYNE, ENGLAND, ASSIGNORS TO CALVERT G. CHIPCHASE, OF SAN FRANCISCO, CALIFORNIA.

WRENCH.

1,010,232.  Specification of Letters Patent.  Patented Nov. 28, 1911.

Application filed January 11, 1911. Serial No. 602,025.

*To all whom it may concern:*

Be it known that we, JOHN CHIPCHASE and ALFRED ERNEST METCALFE, citizens of England, residing at Newcastle-upon-Tyne, England, have invented new and useful Improvements in Wrenches, of which the following is a specification.

This invention relates to a wrench and particularly pertains to a pipe wrench of the chain type.

It is the object of this invention to provide a pipe wrench of the chain type which is adjustable and capable of being applied to pipes of various diameters.

A further object is to provide a chain wrench which is simple in construction, easily operated, and which is so designed as to securely grip a pipe or other cylindrical object, and in which means are provided for preventing slippage of the gripping member.

The invention consists of the parts and the combination and construction of parts as hereinafter more fully described and claimed, having reference to the accompanying drawings in which,—

Figure 1 is a side elevation of the invention as applied. Fig. 2 is an enlarged detail of the gripping members with parts broken away. Fig. 3 is a detail in perspective of the adjusting members. Fig. 4 is a detail view of the block or pawl.

In the drawings, A represents the handle or shank of the wrench, the forward end portion of which is rectangular in cross sections and is provided with serrations or ratchet teeth 2 on its upper edge. The outer end of the shank A is enlarged at 3, and carries a link 4 pivotally mounted on each side thereof, these links 4 being pivotally connected at their lower ends to the end link of a chain 5 of the block type. This chain 5 may be of any suitable length, and is adapted to be lengthened when necessary by connecting additional links to the outer free end thereof.

In applying the wrench to a pipe 6 the free end of the chain 5 is passed around the pipe 6 and inserted between the links 4 beneath the outer end of the shank A. The end link of the chain 5 is adapted to be engaged by a hook or dog 7 pivotally mounted on a yoke 8, which extends around, and is slidable upon the rectangular portion of the shank A. The upper end of the yoke 8 is provided with a pivoted block or pawl 9, which normally gravitates into a locking engagement with the teeth or serrations 2 formed on the upper edge of the rectangular portions of the shank A. After the chain 5 has been passed around the pipe 6, between the links 4 and engaged by the hook 7, the yoke 8 is moved backward on the shank A with the pawl 9 sliding over the teeth or serrations 2 until the chain 5 is pulled taut upon the surface of the pipe 6, as shown in Figs. 1 and 2, whereupon the pawl 9 engages a tooth 2 and retains the chain 5 in close contact with the pipe 6.

The enlarged outer end 3 of the shank A is bent or turned to form a downwardly extended projection or nose 10, which is adapted to be brought into contact with the upper surface of the chain 5 when the latter is passed around the pipe 6, the bearing point of the projection or nose 10 falling on the chain 5 when the shank A is at a right angle to a radial line of the pipe 6. When in this position an upward pull on the outer end of the handle or shank A causes the projecting member or nose 10 to press tightly upon the upper edge of the chain 5 to clamp it tightly against the surface of the pipe 6, and a continued pull upon the handle of the shank A is transferred to the portion of the chain 5 surrounding the pipe 6, through the links 4. The projection or nose 10 acts as a fulcrum for the upward movement of the outer end of the shank A, and the fulcrum point of the nose 10 acts to clamp the chain 5 tightly against the outer surface of the pipe 6.

From the foregoing it will be seen that the greater the upward force exerted upon the outer end of the shank A, the greater will be the gripping action of the chain 5.

In operating the wrench, the downward movement of the outer end of the shank A will loosen the chain 5 upon the pipe 6, so that it may be moved freely around the pipe. This permits of the wrench being employed where only a limited movement of the shank A can be obtained.

From the foregoing it will be seen that I have provided a wrench having a positive grip, and by reason of having a smooth contacting surface the grip may be used on all kinds of hardened pipes, or any turned or hardened surface without causing damage or marring a finished surface.

The chain being secured by means of the pawl on the racked lever, and the nosed crown of the lever bearing upon the chain, a non-slipping and instantaneous grip is insured, and as the chain may be lengthened by adding additional links, the wrench becomes suitable for all sizes of pipes.

Having thus described our invention, what we claim and desire to secure by Letters-Patent, is:—

1. A pipe wrench including a flexible block chain, a round nosed lever having rack teeth on the back, links pivoted to each side of the lever and to one end of the chain, said chain passing around the pipe and between the links, a yoke slidable upon the lever carrying a pawl which engages the rack teeth on the lever, and a hook swiveled to the yoke and adjustably engageable with the chain.

2. A pipe wrench including a flexible block chain coiled around the pipe, links having one end pivoted to the end of the chain, and forming a space between which the continuation of the chain may pass, a lever to which the opposite ends of the links are pivoted, said lever having a curved, round nosed end adapted to compress a link against the pipe, and having rack teeth upon the back, a yoke inclosing and slidable upon the lever, a pawl carried by the outer end of the yoke and engaging the rack teeth, and a hook upon the inner end of the yoke to adjustably engage a link and tighten the chain about the pipe.

In testimony whereof we have hereunto set our hands in the presence of two subscribing witnesses.

JOHN CHIPCHASE.
ALFRED ERNEST METCALFE.

Witnesses:
Geo. C. Bolton,
Jos. R. Hurst.

---

Copies of this patent may be obtained for five cents each, by addressing the "Commissioner of Patents, Washington, D. C."